United States Patent [19]

Zucker et al.

[11] 4,372,768

[45] Feb. 8, 1983

[54] METHOD OF SPLICING ENDS OF OPTICAL FIBERS

[75] Inventors: Joseph Zucker, Foster City; Arthur H. Fitch, Redwood City, both of Calif.

[73] Assignee: GTE Automatic Electric Laboratories, Inc., Northlake, Ill.

[21] Appl. No.: 257,696

[22] Filed: Apr. 27, 1981

[51] Int. Cl.³ .......................... C03B 23/20; G02B 5/14
[52] U.S. Cl. ........................................ 65/4.21; 65/29
[58] Field of Search ......................... 65/4.21, 29, 152; 350/96.21; 156/158

[56] References Cited

U.S. PATENT DOCUMENTS

| | | | |
|---|---|---|---|
| 3,928,102 | 12/1975 | Rowe et al. | 156/158 |
| 4,102,717 | 7/1978 | Hensel | 156/158 X |
| 4,302,072 | 11/1981 | Vucins | 350/96.21 |
| 4,302,267 | 11/1981 | Palmer | 156/158 |

OTHER PUBLICATIONS

Kohanzadek, "Hot Splices of Optical Waveguide Fibers," Applied Optics, vol. 15, No. 3, Mar. 1976, pp. 793-795.
Bisbee, "Splicing Silica Fibers with an Electric Arc," Applied Optics, vol. 15, No. 3, Mar. 1976, pp. 796-798.
Schilb and Dakss, "Compensating Fibre Splice Technique," Electronic Letters, vol. 13, No. 9, Apr. 28, 1977, pp. 257-258.
Stewart et al, "Technique for Jointing Small-Core Optical Fibers," Electronics Letters, vol. 12, No. 21, Oct. 14, 1976, p. 570.
Derosier et al, "Low-Loss Splices in Optical Fibers," The Bell Technical Journal, vol. 52, No. 7, Sep. 1973, pp. 1229-1235.
Dyott et al, "Fusion Junctions for Glass-Fibre Waveguides,38 Electronics Letters, vol. 8, No. 11, Jun. 1, 1972, pp. 290-292.
Benson et al, "Optical Fiber Vacuum Chuck," Applied Optics, vol. 14, No. 4, Apr. 1975, pp. 816-817.

Primary Examiner—Richard V. Fisher
Attorney, Agent, or Firm—Russell A. Cannon

[57] ABSTRACT

A small amount of light that is transmitted in one of a pair of optical fibers having cleaved ends thereof loosely brought into butt contact is converted to leaky modes in the other fiber. Leaky mode light that is radiated out of the perimeter of the other fiber is collected in an integrating enclosure located proximate its one end and extending over a limited length of the other fiber. The light in the enclosure is detected for producing a measure of the degree of alignment of the adjacent ends of the fibers. After the cleaved ends of the fibers are aligned with micromanipulators so as to null the intensity of detected leaky mode radiation, an electrical arc is created across them for permanently joining the fiber ends together in a splice. The integrity of the resultant splice is determined by producing a measure of the splice loss 10 log $(1 - P_R/P_O)$, where $P_R$ is a measure of light scattered from the splice and/or radiated out of the perimeter of the leaky mode section of the other fiber for light of a radiant power $P_O$ in the one fiber and incident on the splice.

13 Claims, 6 Drawing Figures

METHOD OF SPLICING ENDS OF OPTICAL FIBERS

BACKGROUND OF INVENTION

This invention relates to forming splices in optical fibers and more particularly to a method of aligning adjacent ends of optical fibers, prior to joining them in a splice, so as to reduce the amount of light that is lost as a result of the splice.

It is desirable that minimum loss occur as a result of a splice between adjacent one ends of first and second optical fibers. Various methods and structures for supporting and aligning adjacent ends of optical fibers so as to maximize the light transmitted through the fibers prior to forming a splice therebetween are disclosed in literature such as: "Fusion Junctions for Glass-Fibre Waveguides" by R. B. Dyott, et al., *Electronic Letters,* June 1, 1972, Vol. 8-11, pp. 290-292; "Low-Loss Splices in Optical Fibers" by R. M. Derosier, et al., *Bell System Technical Journal,* Vol. 52, No. 7, September, 1973, pp. 1229-1235; "Optical Fiber Vacuum Chuck" by W. W. Benson, et al, *Applied Optics,* April, 1975, Vol. 14, No. 4, pp. 816-817; "Hot Splices of Optical Waveguide Fibers" by Y. Kohanzadeh, *Applied Optics,* March, 1976, Vol. 15, No. 3, pp. 793-795; "Splicing Silica Fibers With an Electrical Arc" by D. L. Bisbee, *Applied Optics,* Vol. 15, No. 3, March, 1976, pp. 796-798; "Technique for Joining Small-Core Optical Fibers" by J. H. Stewart, et al., *Electronic Letters,* Oct. 14, 1976, Vol. 12, No. 21, page 570; and "Compensating Fibre Splice Technique" by M. K. Dakss, et al., *Electronic Letters,* Apr. 28, 1977, Vol. 13, No. 9, pp. 257-258. In a conventional method of forming a fusion splice, for example, the axes of adjacent one ends of a pair of fibers are visually aligned in the y and z directions. The ends of the fibers are then aligned for obtaining a maximum value of light transmitted in the two fibers and detected at the output end of the second fiber. After the one ends of the fibers are brought lightly into butt contact, an electrical arc is produced there for fusing them together. This technique is disadvantageous in field applications including long distance communication channels having opposite ends of the second fiber spaced many kilometers apart since it normally requires a human operator at both ends of the second fiber. An object of this invention is the provision of the improved method of forming a splice between adjacent ends of optical fibers. Another object is the provision of an improved method of aligning ends of fibers that are to be joined in a splice.

SUMMARY OF INVENTION

In accordance with this invention, the method of splicing adjacent one ends of first and second optical fibers together comprises the steps of: passing light in the first fiber in the direction of the one end thereof prior to forming the splice; detecting leaky mode light radiated out of the perimeter of the second fiber in a length thereof that is proximate its one end; and aligning the one ends of the fibers for nulling the detected signal prior to operating on them for effectuating a splice therebetween.

DESCRIPTION OF DRAWING

This invention will be more fully understood from the following detailed description of preferred methods embodying it, together with the drawing in which parts are not drawn to scale. In the drawing.

DESCRIPTION OF PREFERRED EMBODIMENTS

Figure 1:
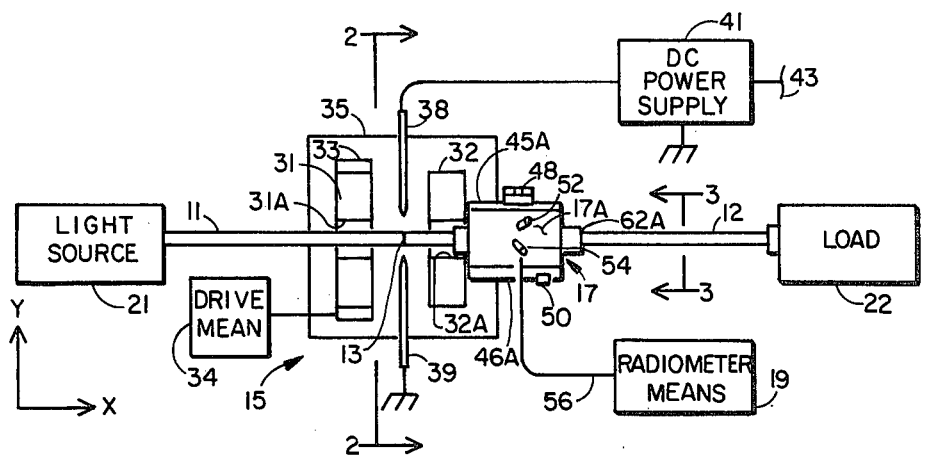
FIG. 1 is a schematic representation of apparatus for practicing a fiber splicing method embodying this invention, a plan view of means 15 providing relative movement of adjacent ends of a pair of fibers and an integrating cylinder 17 of split block construction that encloses the output fiber 12 being shown here.

Referring now to FIG. 1, apparatus for practicing this invention comprises an input fiber 11 that is connected to a light source 21, an output fiber 12 that may be connected to a load 22, fusion splicer means 15, an integrating cylinder 17 of split block construction, and radiometer means 19. The fusion splicer 15 includes apparatus for axially aligning the adjacent one ends of the two fibers and apparatus for operating on the adjacent one ends of the fibers for joining them together in a splice 13. Apparatus for performing these functions is commercially available and is described in the open literature. The fusion splicer means 15 may, by way of example, be a model FW301 Fusion Splicer of Orionics in Albuquerque, N. Mex. This splicer apparatus may include a microscope for visually aligning the one ends of the fibers.

The splicer means in FIG. 1 is shown as comprising vacuum chucks 31 and 32 having associated V-grooves 31A and 32A therein receiving one ends of fibers 11 and 12, respectively. The chuck 32 is rigidly mounted on a support plate 35. The chuck 31, however, is mounted on an x-y-z micromanipulator means 33 that is attached to the plate. The micromanipulator means 33 is caused by a drive means 34, which may comprise a plurality of mechanical micrometers, to adjust the relative positions of the adjacent ends of the fibers. The one ends of the input and output fibers are laid in associated V-grooves and held there by vacuum. Alternatively, the fibers may be held in the V-grooves by magnetic or spring-loaded strips (not shown). In practice, the chucks 31 and 32 are located much closer together than is shown in FIG. 1 for holding the fibers nearer to the adjacent one ends thereof. Also, the thickness of the stationary chuck 32 in the x-direction in FIG. 1 is preferably as small as practicable.

Figure 2:
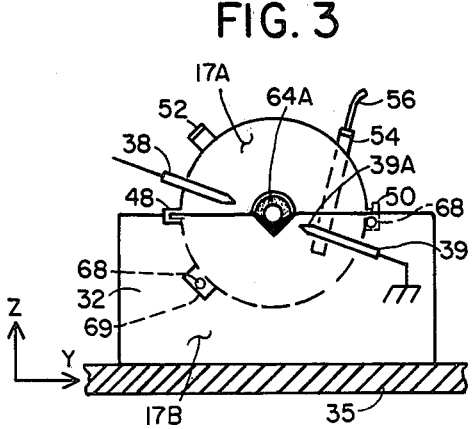
FIG. 2 is a section view of the apparatus taken along the section line 2—2 in FIG. 1.
Figure 5:
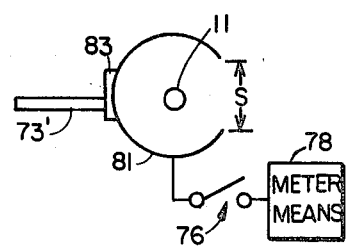
FIG. 5 is a side view of an alternate embodiment of the detector in FIG. 4.

The fusion splicer 15 also comprises a pair of electrodes 38 and 39 (see FIG. 2) that are electrically connected between a DC power supply 41 and a ground reference potential. The electrodes are held by support means (not shown) with their axes aligned in a plane that is orthogonal to the axes of the fibers at the one ends thereof. The free ends (e.g., end 39A) of the electrodes are located proximate the adjacent edge surfaces of the fibers and on opposite sides of the axes thereof (see FIG. 2). When the one ends of the fibers are in satisfactory alignment and lightly butted together, the switch 43 is pressed for causing an electrical arc to be created across the junction of the fibers for fusing them together.

The integrating cylinder 17 is an enclosure that converts input light into diffuse light in the interior thereof. Integrating enclosures are manufactured by Labsphere of New London, N.H. The integrating cylinder 17 is split into halves 17A and 17B by a cutting plane that is parallel to the plane of the paper. Flanges 45A and 46A extend over the length of the cylinder adjacent the open edges of the top 17A of the cylinder. Associated flanges 45B and 46B (not shown) extend over the length of the cylinder adjacent the open edges of the bottom of the cylinder. A hinge 48 is attached to the flanges 45 to facilitate opening and closing the cylinder. Alignment holes and pins (not shown) may be located along the flanges for providing precision alignment of the interior surfaces of the cylinder parts. The two halves of the integrating cylinder are secured together with clamps 50 on the flanges to form a light-tight enclosure. The top 17A of the cylinder may contain an input port 52 comprising a socket receiving a fiber connector that is adapted for releasably holding the one end of the input fiber 11 prior to forming a splice and its being located in the vacuum chuck 31, as is described more fully hereinafter. The top of the cylinder also contains an output port 54 comprising a socket that is dimensioned for receiving a ferrule that is attached to one end of a fiber bundle 56 that has its other end connected to the radiometer means. The sockets in the input and output ports are oriented so that a light ray emanating into the cylinder from a fiber in the input port or radiated from the perimeter of the output fiber will not be directly incident on the end of a bundle fiber inside the cylinder.

Figure 3:
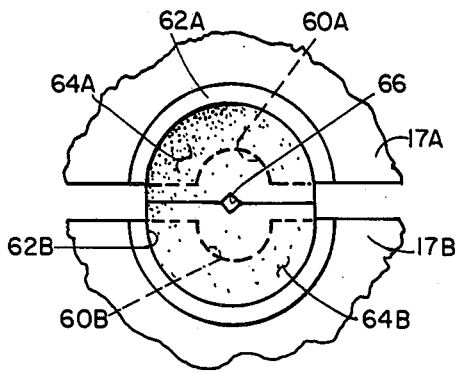
FIG. 3 is an enlarged side view of a portion of the integrating cylinder 17 prior to clamping the two halves thereof together, and taken along section line 3—3 in FIG. 1.

Each of the cylinder parts includes axially-aligned spaced-apart semi-circular openings that extend through the ends thereof and which are coaxial with the axis of the cylinder. The semicircular openings, e.g. openings 60A and 60B in FIG. 3, are made to form a circular opening that is larger than the diameter of the fibers when the cylinder parts are clamped together. Semicircular channels, such as the channels 62A and 62B in FIG. 3, are also fabricated on the ends of the cylinder coaxial with the axis thereof and thus associated ones of the circular openings. Associated channels also mate when the cylinder parts are clamped together. The semicircular channels 62A and 62B, for example, are filled with inserts 64A and 64B of resilient dielectric material such as a flexible polyester polyurethane foam that extends above the edges of the cylinder parts when it is open, see FIG. 3. Shallow troughs 66 are cut into the facing surfaces of the foam inserts to facilitate locating the optical fiber 12 along the cylinder axis when it is open. The cylinder is preferably securely attached to the fixed chuck 32 by screws 68 in flanges 69, see FIG. 2, with the axis of the cylinder spaced slightly above the bottom of the V-groove 32A. In practicing this invention, the cylinder is opened so that the output fiber 12 can be located in a groove 66 of an insert. The cylinder is then closed for firmly sandwiching the output fiber between the foam inserts which securely hold it in place without introducing compression modes in it. The sides of the inserts that face into the cylinder are preferably coated with a light reflective paint, as is the interior of the sphere.

It has been discovered that the output one of a pair of optical fibers connected in a poor splice, as well as the output fiber of a pair of misaligned fibers that are brought together for being joined in a splice, supports leaky mode radiation of a significant-measurable level over a length of approximately one foot downstream of (i.e., moving away from) the splice. That is, in addition to light in the input fiber being scattered by the junction of the edges of the fibers (i.e., the splice), some of the input light is converted into leaky modes in the core and cladding of the output fiber. This leaky mode radiation escapes through the circumference of the output fiber, being radiated generally transversely away from this fiber. It has been determined empirically that when misaligned fibers are brought together for being joined in a splice, the amount of leaky mode light radiated by the output fiber downstream of the one end thereof may be greater than that scattered from the immediate vicinity of the adjacent one ends of the fibers and the splice.

In accordance with this invention, the protective plastic coating is removed from a short length of input fiber and approximately 1.5 feet of output fiber adjacent the one ends thereof. The ends of the fibers are then cleaved for providing edges thereof that are substantially orthogonal to the fiber axes. The exposed output fiber is laid along the groove 66 in the open cylinder 17 and in the groove of the stationary chuck 32 with its one end generally aligned with the axes of the electrodes 38 and 39. The output fiber is held in this position by a vacuum that is generated in the chuck 32. In a similar manner, the input fiber is laid in the groove of the other chuck 31 with its one end juxtaposed with and spaced slightly from the one end of the output fiber. The input fiber is also held in this position by producing a vacuum in the chuck 31. This placement of the fibers locates the axes thereof in general alignment. The cylinder 17 preferably extends over a substantial portion of the length, e.g. five inches of output fiber, extending downstream of the one ends of the output fiber, and is securely closed prior to energizing the light source 21 for illuminating the one ends of the fibers and producing leaky mode radiation in the output fiber. The diameter of the cylinder is preferably small, e.g., one inch. Light that is scattered from the adjacent edges of the fibers is lost. Light from the input fiber that is converted to leaky mode light in the output fiber and radiated from the length thereof within the cylinder is converted to diffuse light there. The operation of the cylinder integrates or sums the radiated light in it. The radiometer means produces an indication $P_R$ of light radiated by the output fiber.

Figure 6:
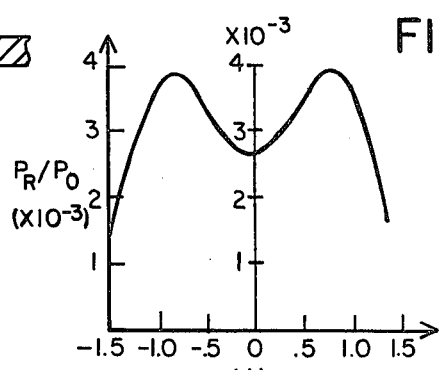
FIG. 6 is a curve that graphically illustrates alignment of adjacent ends of the two fibers for nulling leaky mode light radiated by the output fiber, and more particularly is a plot of the power ratio $P_R/P_O$ (i.e., leaky mode light $P_R$ radiated from the output fiber normalized by light in the input fiber that is incident on the edge of the one end thereof) as a function of the fiber offset ratio $d/d_c$ (i.e., the fiber offset d normalized by the diameter $d_c$ of the fiber cores).

The drive means 34 is manually operated, for example, while viewing the indication provided by the radiometer for moving the one end of the input fiber transversely in the y and z directions for nulling the intensity of the detected light. That is, the axial position of the one end of the input fiber is moved first in the ±y directions and then in the ±z directions for producing minimum signal level indications on the radiometer from which the value increases on either side of the null point in both the y and z directions, the x and y directions being in the plane of the paper in FIG. 1. Stated differently, the one end of the input fiber is moved transversely for adjusting the indication on the radiometer to be a minimum or low point on a saddle, which point corresponds to the lowest amount of variation reached on a control function between two higher values. This is illustrated graphically in FIG. 6 where the indication $P_R$ provided by the radiometer is normalized by the power $P_O$ of light in the input fiber that is incident on the one ends of the fibers, and the offset d of the fiber axes is normalized by the common diameter $d_c$ of the fiber cores. The indication $P_O$ may be obtained by locating the one end of the input fiber in the socket 52 on the enclosure and taking the reading from the radiometer prior to placing this fiber in chuck 31. The curve here was plotted with the aid of an integrating sphere enclosing output fiber spaced 6 to 9 inches downstream of the splice point.

After the ends of the fibers are satisfactorily aligned, as indicated by y and z direction null points on the radiometer, the drive means is caused to move the input fiber slightly in the +x direction in FIG. 1 so that the ends of the fibers are lightly in butt contact. The switch 43 is then actuated for producing an electrical arc between the electrodes for heating the one ends of the fibers and fusing them together in a splice 13. After the splice is completed, the integrity or quality of the splice can be measured by again illuminating the splice with the light of intensity $P_O$ in the fiber 11 and monitoring the light $P_R$ radiated by the length of output fiber in the integrating cylinder. A good measure of the splice loss is obtained from the relationship $$10 \log (1 - P_R/P_O) \tag{1}$$

As indicated above, some of the light transmitted in fiber 11 is scattered by the splice itself and some of it is radiated from the adjacent length of downstream output fiber that is approximately one foot long. Analysis of a number of splices has shown that the intensity of leaky mode light radiated by the output fiber may, in some instances, be greater than that of the light scattered from the splice itself. Thus, the optimum value of splice loss is obtained with a value of $P_R$ produced by integrating both the light scattered by the splice and the light radiated out of the perimeter of the output fiber. Since it is only necessary that adjacent ends of the fibers be precisely aligned for providing maximum transmission of light in them, however, light scattered from the adjacent ends of the fibers or light radiated from any length of output fiber exhibiting substantial radiation of leaky mode light provides an indication of the alignment of the two fibers. Additionally, it has been determined empirically that a good indication of the quality of a splice is obtained by integrating only scattered light in a length of output fiber extending from three inches to twelve inches downstream of the splice. Test results also show that light radiated from shorter lengths of output fiber may be employed satisfactorily for indicating the quality of a splice and alignment of fibers.

In two embodiments that were built and operated for practicing the method of this invention, the integrating enclosure 17 was an integrating sphere having an inner diameter of three inches, and a cylinder with an inner diameter of $\frac{3}{4}$ inch and a length of $1\frac{3}{4}$ inches. In these apparatus, the thickness of the corresponding output chuck 32 caused the sphere to integrate light in a length of output fiber extending from three inches to six inches downstream of the one ends of the fibers in the case of the sphere and from 3 to $4\frac{3}{4}$ inches downstream of the one ends of the fibers in the case of the cylinder. The enclosures were also sequentially advanced along the output fiber in increments of their lengths for obtaining indications $P_R$ of light radiated from successive lengths of output fiber exhibiting leaky mode radiation as a result of the spacing between the one ends of the fibers and/or the splice. Leaky mode radiation at points along the output fiber was determined to be of a significant level when its power level was readily measureable and of a magnitude having a real effect on the overall-integrated value of $P_R$ for light emitted by the splice and the adjacent one-foot length of output fiber. A value for $P_R$ corresponding to the integral of light emitted by the splice and the adjacent one foot length of output fiber is obtained with such a three inch sphere by summing values of $P_R$ obtained from successive three inch increments of output fiber in which the splice is located just inside the sphere for one of the measurements. By way of example, the leaky mode radiation is no longer of a significant value when it decreases by an order of magnitude from the highest measureable value thereof in the downstream length of output fiber. In analyzing a number of spliced fibers, it was found that leaky mode radiation falls to a relatively low level at a distance of approximately one foot away from the location of a splice. The leaky mode radiation fell to a level that was at least an order of magnitude less than a previous high value thereof for points on an output fiber within a fifteen inch length thereof downstream of the location of a splice.

Figure 4:
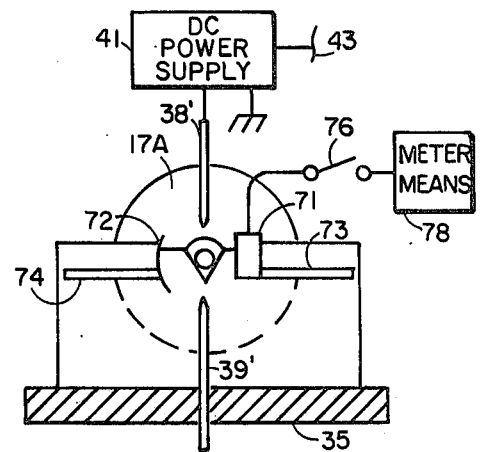
FIG. 4 is a section view, similar to FIG. 2, of other apparatus useful in practicing a method embodying an alternate form of this invention.

Apparatus for practicing an alternate method embodying this invention is illustrated in FIG. 4 which is a section view of apparatus similar to that in FIG. 1 and taken along line 2—2 there. The electrodes 38' and 39' in FIG. 4 are axially aligned in the vertical direction with the free ends thereof on opposite sides of the edge surfaces of the fibers. A photodetector 71 and reflector 72 are located on opposite sides of the fibers at the location of the splice. The detector 71 is connected through a switch 76 to meter means 78 for providing an indication of light scattered from the immediate vicinity of adjacent edge surfaces of the fibers during alignment of the one ends thereof. The detector 71 and reflector 72 are mounted in tracks 73 and 74 on the chuck 32 for moving them away from the fibers prior to forming a splice. The switch 76 is also opened prior to producing an electrical arc for fusing the fibers together in order to protect the meter 78. The indication of scattered light provided by the meter 78 may be used alone or in conjunction with the indication provided by the radiometer for identifying null points and determining optimum alignment of the fibers. Alternatively, a semi-cylindrical photodetector means 81 may extend over the edges of the one ends of the fibers and adjacent short segments thereof. The full breadth of the interior surface of the cylinder is coated with a photosensitive material for detecting the maximum amount of light scattered from the edge surfaces of the fibers. A mounting plate 83 on the photodetector means is connected to a track 73' for moving it away from the area of the fibers prior to making a splice. The width S of the slot in the detector means 81 is greater than the diameter of the fibers.

Although this invention is described in relation to preferred embodiments thereof, variations and modifications will occur to those skilled in the art. By way of example, the novel method is applicable to radiant energy and light in both the visible and invisible electromagnetic spectrum in the high and low ends of the frequency spectrum including both ultraviolet and infrared radiation. Also, the integrating enclosure may be of any other convenient shape, although it preferably has a regular shape. Further, the enclosure does not have to be split into parts of the same size and a photodetector of the radiometer means may be located directly in an opening of the output port 54 on the integrating enclosure rather than coupling diffuse light to it over a fiber bundle or single fiber. And if the intensity of diffuse light coupled to the radiometer means is insufficient to obtain a clear and definite reading, the light source may be pulsed or the output thereof mechanically chopped at a fixed repetition frequency for producing a varying electrical current in the radiometer means for increasing the sensitivity of the detector in a manner that is well known in the art. Additionally, the enclosure 17 may be replaced with a photodetector 71 or 81 located adjacent the leaky mode section of output fiber. Or a PIN or avalanche photodiode comprising a light-pipe or bundle of optical fibers coupling radiated leaky mode light from the perimeter of the output fiber to a light sensitive surface may be employed in place of the integrating enclosure. The diameter of such a light pipe is approximately 10 mils, whereas the diameter of the output fiber is in the order of 120 microns, which is approximately 5 mils. Also, other types of apparatus may be employed for holding and adjusting the ends of fibers and producing other types of junctions joining the ends of fibers together. Additionally, the axes of the fibers may be tilted with respect to each other for improving the transmission of light between adjacent ends thereof. The scope of this invention is therefore defined by the appended claims rather than the aforementioned detailed descriptions of preferred embodiments thereof.

What is claimed is:

1. A method of splicing adjacent one ends of first and second optical fibers together comprising the steps of:
   passing light in the first fiber in the direction of the one end thereof,
   detecting light radiated from the perimeter of the second fiber in a length thereof that is proximate its one end and that supports substantial leaky mode light waves, and
   adjusting the relative position of the one ends of the fibers for nulling the detected signal prior to operating on them for effectuating a splice therebetween.

2. The method according to claim 1 wherein said detecting step comprises producing a measure of radiated light that is passed out of the circumference of the second fiber over at least a segment of the length thereof exhibiting substantial leaky mode radiation.

3. The method according to claim 2 wherein said detecting step comprises producing a measure of the average value of radiated light.

4. The method according to claim 2 wherein said adjusting step further comprises holding the fibers proximate the one ends thereof, said radiating segment of the length of second fiber extending downstream from points at which the one end of the second fiber is held.

5. The method according to claim 4 wherein said radiating segment of the length of the second fiber extends at least five inches downstream of the holding point on the second fiber.

6. The method according to claim 1 wherein said detecting step comprises integrating radiated light passed out of the perimeter of the second fiber over a portion of the length thereof supporting substantial leaky mode radiation.

7. The method according to claim 6 wherein said detecting step further comprises locating said portion of the length of second fiber inside an integrating light enclosure whereby light radiated through the circumference of said second fiber produces diffuse light in said enclosure, and detecting diffuse light in said integrating enclosure for producing the measure of radiated light.

8. The method of splicing one ends of first and second fibers together comprising the steps of
   supporting the fibers proximate the one ends thereof for locating the one ends adjacent each other with the fiber axes in the area of their one ends being generally coaxial,
   transmitting light in the first fiber in the direction of the one end thereof so that it is propagated into the second fiber,
   detecting light radiated from the perimeter of the second fiber in a length thereof that is proximate its one end and which supports substantial leaky mode radiation of light,
   adjusting the relative positions of the one ends of the fibers for nulling the detected signal, and
   operating on the fibers for effectuating a splice between the one ends thereof.

9. The method according to claim 8 wherein said detecting step comprises producing a measure of radiated light passed out of the circumference of the second fiber over at least a segment of the length thereof exhibiting substantial leaky mode radiation.

10. The method according to claim 9 wherein said radiating segment of the length of second fiber extends at least five inches downstream from points at which the one end of the second fiber is held.

11. The method according to claim 10 wherein said detecting step comprises producing a measure of the average value of radiated light.

12. The method according to claim 8 wherein said detecting step comprises integrating radiated light passed out of the perimeter of the second fiber over a segment thereof exhibiting substantial leaky mode radiation.

13. The method according to claim 8 wherein said operating step comprises providing relative movement of the fibers in their axial directions so as to move the edge surfaces of the one ends thereof lightly into physical contact prior to completing the fabrication of a splice.

* * * * *